UNITED STATES PATENT OFFICE.

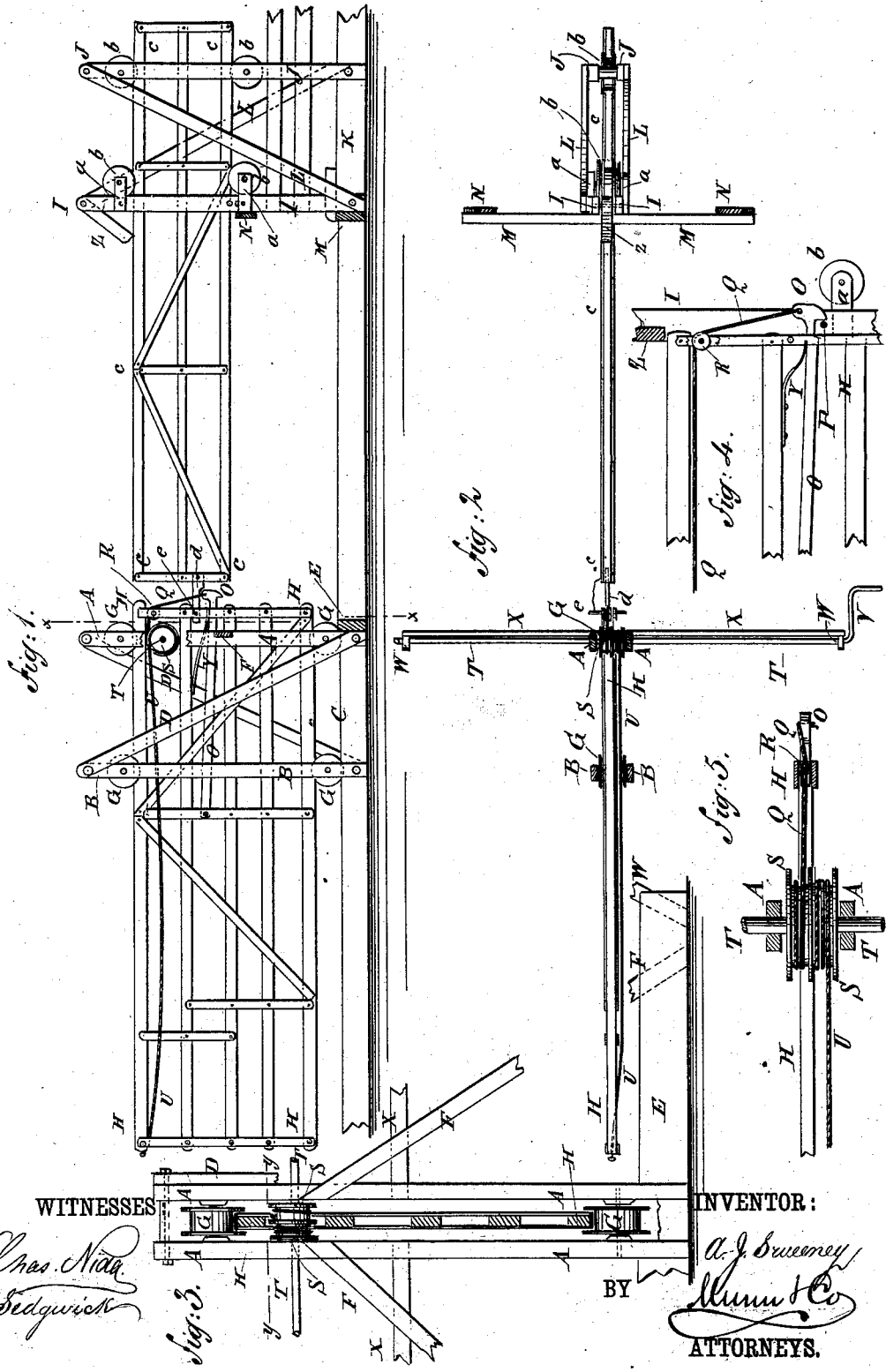

ANDREW JACKSON SWEENEY, OF PANA, ILLINOIS.

GATE.

SPECIFICATION forming part of Letters Patent No. 281,647, dated July 17, 1883.

Application filed December 20, 1882. (No model.)

*To all whom it may concern:*

Be it known that I, ANDREW JACKSON SWEENEY, of Pana, in the county of Christian and State of Illinois, have invented a new and useful Improvement in Gates, of which the following is a full, clear, and exact description.

Reference is to be had to the accompanying drawings, forming a part of this specification, in which similar letters of reference indicate corresponding parts in all the figures.

Figure 1 is a front elevation of my improved gate shown open, part being broken away and partly in section, and showing the stock-gate closed. Fig. 2 is a plan view of the same, partly in section and parts being broken away. Fig. 3 is a sectional end elevation of the same, taken through the line $x\ x$, Fig. 1. Fig. 4 is a sectional side elevation of a part of the same, showing the gate fastened shut. Fig. 5 is a sectional plan view of a part of the same, taken through the line $y\ y$, Fig. 3.

The object of this invention is to facilitate the opening and closing of gates, and also to promote convenience in preventing cattle and horses from passing through the gateway, while allowing calves, sheep, and hogs to pass through freely.

To the front pair of posts is journaled a crank-rod carrying a double drum having two cords attached to it and wound upon it in opposite directions, the rear cord being attached to the rear end of the gate and the forward cord being attached to the gate-latch, so that the gate can be readily opened and closed.

To the forward end of the main gate is connected the end of the stock-gate, which is supported by and moves upon flanged rollers, connected with two pairs of posts, connected and held erect by braces and base-bars, so that the stock-gate can be moved back and forth across the gateway by the movements of the main gate, as will be hereinafter fully described.

A B are two pairs of posts, which are connected by a base-bar, C, and by inclined braces D, to keep the said posts in proper relative positions. The posts A B are held in vertical positions by a transverse bar, E, attached to the lower ends of the forward pair, A, of posts, and strengthened in position by inclined braces F, attached at their lower ends to the said bar E and at their upper ends to the said posts A.

To and between the lower and the upper parts of the posts of each pair A B are pivoted flanged rollers G, which receive the top and the bottom rails of the gate H to support the said gate, keep it in a horizontal position, and cause it to move easily when being opened and closed. The gate H is formed of horizontal bars, connected at their ends and at intermediate points by pairs of vertical bars, and strengthened by pairs of inclined bars, as shown in Fig. 1. At the other side of the gateway are placed two pairs of posts, I J, which are connected by a base-bar, K, and inclined bars L, and are held in a vertical position by a transverse base-bar, M, strengthened in position by inclined bars N in the same manner as the posts A B.

O is the gate-latch, which passes between the front upright bars of the gate H and is hinged to and between the bars of the second pair, as shown in Fig. 1. The forward end of the latch O projects, is inclined or rounded upon its lower side, and has a hook or shoulder formed upon it to engage with a pin, P, passed through the pair of posts I, as shown in Fig. 4. The free end of the latch O is held down upon the catch-pin P by a spring, Y, the inner end of which is attached to the bar of the gate H above the said latch, and its outer end rests upon the latch O between the front bars of the said gate. The elasticity of the spring Y allows the latch O to be raised in opening and closing the gate. The gate H is prevented from being raised by cattle, and thus unfastened, by a swinging stop-bar, Z, placed between the upper parts of the posts I and hinged at its upper end to the said posts by a bolt.

To the upper part of the projecting end of the latch O is attached the end of a cord, Q, which passes over a small pulley, R, pivoted to and between the forward upright bars of the gate H, below the end of the top bar of the said gate.

From the pulley R the cord Q passes to, is wound around, and its end is secured to a part of the drum S, keyed or otherwise secured to a rod, T, which revolves in bearings in the posts A. The drum S is made double, and to its other part is secured the end of a cord, U, which is wound around the said drum S in the opposite direction from the cord Q, so that one of the said cords will be unwound from the said drum as the other cord is wound upon it. The other end of the cord U is secured to the rear upper corner of the gate H.

The rod T is made of any desired length, and to its ends are attached, or upon them are formed, cranks V. The outer parts of the rod T revolve in bearings attached to the upper ends of the supports W, the lower ends of which are attached to the ends of the base-bar E, and which are strengthened in position by the braces X, attached to them and to the braces F or posts A. With this construction the gate is closed by turning the crank-rod T, which winds the cord U upon the drum S and unwinds the cord Q from the said drum, causing the gate to move forward upon the rollers G. As the gate H reaches the end of its forward movement the latch O strikes, rises, passes over, and drops down upon the catch-pin P, fastening the gate closed. When the crank-rod T is turned in the other direction, the cord Q is wound upon, and the cord U is unwound from, the drum S. As the cord Q is wound upon the drum S the first effect is to raise the latch O from the catch-pin P, and the second effect is to draw the gate open.

To the upper and middle parts of the posts J, and to brackets $a$, attached to the upper and middle parts of the posts I, are pivoted flanged rollers $b$, to receive between them and to support in a horizontal position the stock-gate $c$, which is thus supported with its lower edge at such a distance from the ground that calves, sheep, and hogs can pass beneath it freely, but the passage of cattle and horses will be prevented.

To the forward end of the stock-gate $c$ is hinged a short bar, $d$, the outer end of which has a hole formed through it to receive the pin $e$, which also passes through a hole in the front upright bars of the gate H, so that the gate $c$ can be drawn across and pushed back from the gateway by operating the gate H.

I am aware that it is not new to move back and forth a sliding gate on rollers by a windlass, rope, and pulleys between fixed posts; but What I do claim as new is—

1. The combination of a main sliding gate, H, and a sliding stock-gate, $c$, with an intermediate bar, $d$, hinged to gate $c$ and connected by a pin, $e$, with gate H, as and for the purpose specified.

2. The combination, with the gate H and the pairs of posts I J and their supporting and connecting bars, of the flanged rollers $b$, the roller-supports $a$, the stock-gate $c$, and a connecting device, substantially as herein shown and described, whereby the stock-gate can be moved back and forth across the gateway by the movements of the main gate, as set forth.

ANDREW JACKSON SWEENEY.

Witnesses:
J. E. MILLER,
B. McLAIN.